(12) United States Patent
Kowalewski (10) Patent No.: US 7,974,720 B2
(45) Date of Patent: Jul. 5, 2011

(54) DYNAMIC FULFILLMENT PLANNING METHOD AND APPARATUS

(75) Inventor: Marcus Klaus Kowalewski, Stutensee (DE)

(73) Assignee: Icon-SCM GmbH & Co. KG, Karlsruhe (DE)

( * ) Notice: Subject to any disclaimer, the term of this patent is extended or adjusted under 35 U.S.C. 154(b) by 554 days.

(21) Appl. No.: 12/189,864

(22) Filed: Aug. 12, 2008

(65) Prior Publication Data

US 2010/0042240 A1 Feb. 18, 2010

(51) Int. Cl.
*G06F 19/00* (2006.01)
*G06F 17/18* (2006.01)
(52) U.S. Cl. ......... 700/97; 700/100; 702/179; 702/180; 702/181; 702/182; 702/183
(58) Field of Classification Search .................... 700/97, 700/100; 705/8, 9, 10, 11; 702/179–183
See application file for complete search history.

(56) References Cited

U.S. PATENT DOCUMENTS

| | | | |
|---|---|---|---|
| 4,933,761 A * | 6/1990 | Murakami et al. | 375/240.22 |
| 5,953,707 A * | 9/1999 | Huang et al. | 705/10 |
| 6,073,055 A * | 6/2000 | Jahn et al. | 700/97 |
| 6,393,332 B1 | 5/2002 | Gleditsch et al. | |
| 6,785,581 B2 | 8/2004 | Mountcastle, III et al. | |
| 6,925,422 B1 * | 8/2005 | Desmond | 702/187 |
| 6,965,867 B1 | 11/2005 | Jameson | |
| 6,999,829 B2 | 2/2006 | Bazzocchi et al. | |
| 7,003,474 B2 * | 2/2006 | Lidow | 705/7 |
| 7,058,587 B1 * | 6/2006 | Horne | 705/7 |
| 7,212,976 B2 * | 5/2007 | Scheer | 705/7 |
| 7,295,990 B1 | 11/2007 | Braumoeller et al. | |
| 7,356,440 B1 * | 4/2008 | Kralik et al. | 702/182 |
| 7,444,295 B2 * | 10/2008 | Peachey-Kountz et al. | 705/8 |
| 7,747,543 B1 | 6/2010 | Braumoeller et al. | 705/330 |
| 2002/0019761 A1 * | 2/2002 | Lidow | 705/10 |
| 2002/0138358 A1 * | 9/2002 | Scheer | 705/26 |
| 2002/0147622 A1 * | 10/2002 | Drolet et al. | 705/7 |
| 2002/0188499 A1 * | 12/2002 | Jenkins et al. | 705/10 |
| 2003/0018516 A1 * | 1/2003 | Ayala et al. | 705/10 |
| 2003/0144896 A1 * | 7/2003 | Ko et al. | 705/10 |
| 2003/0171962 A1 * | 9/2003 | Hirth et al. | 705/7 |
| 2003/0229550 A1 * | 12/2003 | DiPrima et al. | 705/28 |
| 2005/0015288 A1 | 1/2005 | Reeves et al. | |
| 2009/0099676 A1 * | 4/2009 | Rothenburg | 700/97 |
| 2010/0138264 A1 * | 6/2010 | Faris et al. | 705/8 |

OTHER PUBLICATIONS

Ghiassi et al., "Defining the Internet-based Supply Chain System for Mass Customized Markets", 2003, Santa Clara University, 17-41.*
Landeghem-H.V., "Robust Planning: A New Paradigm for Demand Chain Planning", 2002, Elsevier, Journal of Operations Management, p. 769-783.*

(Continued)

*Primary Examiner* — Ramesh B Patel
*Assistant Examiner* — Thomas Stevens
(74) *Attorney, Agent, or Firm* — Goodman, Allen & Filetti PLLC (57) ABSTRACT

This invention relates to a method for production planning in which changing demands and current demands are combined and separated into fixed demands, time-flexible demands, and quantity-flexible demands before being prioritized according to a set of rules that optimize efficient handling of changing demands while minimizing changes in and maximizing flexibility of a production schedule.

14 Claims, 6 Drawing Sheets

OTHER PUBLICATIONS

Candas et al., "Benefits of Considering Inventory in Service parts Logistics Network Design Problems with Time-based Service Constrraints", University of Texas at Austin, 2006, 30 pages.*

Duran et al., "Optimal Production and Inventory Policies of Priority and Price-Differentialed Customers", 2005, IEEE, 20 pages.*

* cited by examiner

| PERIOD | 0 | 1 | 2 | 3 | 4 | 5 | 6 | 7 | 8 | 9 | 10 | |
|---|---|---|---|---|---|---|---|---|---|---|---|---|
| BD | 9 | 23 | 8 | 19 | 14 | 1 | 0 | 8 | 3 | 17 | 4 | 106 |
| UD | 13 | 25 | 14 | 19 | 16 | 7 | 5 | 11 | 4 | 20 | 3 | 137 |
| CED | 0 | 0 | 0 | 0 | 0 | 0 | 0 | 4 | 8 | 28 | 31 | |
| NA | 0 | 0 | 0 | 0 | 0 | 0 | 0 | 4 | 4 | 20 | 3 | 31 |
| NUD | 13 | 25 | 14 | 19 | 16 | 7 | 5 | 7 | 0 | 0 | 0 | 106 |
| SNUD | 9 | 23 | 8 | 19 | 14 | 1 | 0 | 7 | 0 | 0 | 0 | 81 |
| ENUD | 4 | 2 | 6 | 0 | 2 | 6 | 5 | 0 | 0 | 0 | 0 | 25 |
| DU | 0 | 0 | 0 | 0 | 0 | 0 | 0 | 1 | 3 | 17 | 4 | 25 |

DYNAMIC FULFILLMENT PLANNING METHOD AND APPARATUS

BACKGROUND ART

Modern production planning uses various methods and techniques to determine when and how much of certain products are to be produced in order to satisfy customer demand while optimally using available resources, available inventories, and available time. Typically, a production plant, through a regularly scheduled process, would determine a plant production schedule for a certain time frame based on plant capacity, current customer orders, and forecast demands. Knowing expected delivery dates is often important for customers, so production plans typically detail rigid production schedules and shipment dates.

It is common, in many industries that rely on production plants, for customers to wish to change their orders. Customers may wish to change the product type ordered, quantity ordered, or delivery date requested in order to fulfill their own obligations. Such changes are typically considered the next time the plant production schedule is evaluated. In some cases, the plant may be able to accommodate such a change with little to no problems. However, in many cases, when a change requested is too large or too close to the final production date, a plant is simply unable to accommodate the customer's wishes and either the customer or the plant will be financially damaged as a result.

In some solutions, such as that described in U.S. Pat. No. 6,393,332, a planning system will attempt to schedule new customer orders in a fashion that uses the plant capacity closest to the required completion date so as to use less of the near-term plant capacity. In these solutions, the plant is able to accommodate more last-minute changes because the last-minute resources are assigned last. However, such planning systems are prone to plant underutilization because established orders become locked into the fulfillment plan without a chance to be reevaluated and repositioned along the production timeframe.

In solutions where the existing orders are reevaluated in determining whether or not a plant can accommodate a demand change, order competition may arise between the existing and updated orders. As customer orders compete for production resources, new or updated orders for one customer can lead to rescheduling of other customers' orders, even ones with previously confirmed production or shipping dates. As a result, production plants managers are placed in a position where they must weigh the costs and benefits of either accepting the requested changes to their production schedule or maintaining the commitments of the current customer demands already established in the production schedule.

Customer demand changes can therefore result in high organizational and administrative costs. Also, such demand changes may force the production plant to miss established deadlines, thus leading to a decline in customer satisfaction. Either situation leads to missed revenue growth opportunities or possible revenue loss. Any unreliable lead times deprive customers of a reliable planning base for their own operations and increase variability in the supply chain, which can lead to a need for large, inefficient safety stocks.

Some current solutions that overcome these drawbacks use a "frozen zone" time period in their production plans. During the "frozen zone" time period, which usually extends for a period of several days or weeks prior to the delivery date depending on the production complexity, no changes in a customer's order are allowed. This approach, while alleviating the difficult change-or-stay decision dilemma of the manager in charge of production planning, takes out any short-term flexibility once available in the ordering and production process. A customer is then locked into an order after a certain date even if the customer's needs drastically change. This problem is exacerbated in industries with short life-cycle products. This restriction on ordering freedom can cause customers to shop around for a production plant with a shorter "frozen zone" time period which may only be offered by a small number of production plants with large enough safety assets.

Another solution to the change-or-stay decision dilemma is used in some production plants where customers or distribution channels are assigned different importance levels. In some of these plants, the production schedules allocate a limited product supply or limited resources to minor accounts in order to ensure order fulfillment for key accounts. While this solution fixes allocation of supply, it reduces the flexibility available for producers or consumers to follow market demand. This reduced flexibility again jeopardizes revenue opportunities.

Additionally, many current solutions, including U.S. Pat. No. 6,393,332, use complicated algorithms and systems that take longer to run and analyze and require specialized systems and implementations that can greatly increase start-up costs. As a result, there is a current need for a fulfillment planning system which can operate with more efficiency and economy. This need is felt more in smaller and younger operations in need of a fulfillment planning system.

Many current solutions, such as U.S. Pat. No. 7,295,990, attempt to solve fulfillment planning solutions by forecasting ahead in an attempt to guess future demand. While this technique has its benefits, there are also numerous risks inherently involved in forecasting which make such systems unusable in certain fields. As a result, there is a current need for a fulfillment planning system which is capable of creating an accurate and efficient fulfillment plan without relying on estimated and forecast data. This need is especially prevalent in risk-adverse fulfillment operations that are unable to accommodate excessive safety stocks or unfulfilled orders.

There is a current need for a fulfillment planning system which, among other benefits, provides: Reliability of production plans for customers; Steadiness of production plans; Supply and production flexibility in terms of both quantity and time, and; Alignment of marketing and sales strategy with supply. There is also a current need for a fulfillment planning system which can accomplish these goals efficiently and economically.

SUMMARY OF THE INVENTION

While some preferred embodiments of the invention are implemented through software means such as a spreadsheet program, it is readily apparent to one skilled in the art that this invention can be implemented in a number of other ways.

The dynamic fulfillment planning process described herein allows for automated adaptation of an existing production schedule to dynamically updated customer demands. There is no need to forecast future demand and the generated fulfillment plan allocates any updated production across the fulfillment timeframe with minimal impact.

In some preferred embodiments, a demand refers to customer orders, source or destination channels, source or destination regions, available parts or components, or combinations thereof. Additional or alternate demands may be easily incorporated into this process as necessary in order to determine the production schedule based on any number of desired signals not mentioned herein. The demands are interpreted as demand signals. Each demand signal is represented as a time series of requested quantities. In some preferred embodiments, updated demand information is received and automatically processed in three phases: a demand evaluation phase, a demand prioritization phase, and a fulfillment plan generation phase.

In a preferred embodiment, during the demand evaluation phase, an updated demand signal is analyzed and matched against a baseline demand signal. The baseline demand signal represents the current customer demands as currently planned for fulfillment. The updated demand signal represents a new set of customer demands not currently incorporated into the fulfillment plan. Analysis and matching calculations isolate the updated demand signal into a set of constrained demand signals. In some preferred embodiments, the constrained demand signals are a fixed-committed demand signal, a time-flexible demand signal, and a quantity-flexible demand signal. Fixed-committed demand signals represent that demand which is established and will be completed as previously planned. Time-flexible demand signals represent that demand which is to be completed during later time periods within the fulfillment timeframe. Quantity-flexible demand signals represent that demand which can change in quantity without impacting the fulfillment plan.

In some preferred embodiments, during the demand prioritization phase, each constrained demand time series created during the demand evaluation phase is processed according to a set of one or more priority rules that assign priorities to each series. The priority rules of the prioritization phase can be customized to each user, industry, product, production plant, or other variable. In some preferred embodiments, the priority rules are created by the plant's central governance body or a marketing body to ensure the plant's high-level goals are achieved. Some preferred embodiments of this invention ensure that the type of demand signal (fixed-committed, time-flexible, or quantity-flexible) is included as a priority rule. Some preferred embodiments of priority rules include rules that prioritize customers, channels, regions, markets, or other factors.

In some preferred embodiments, during the fulfillment plan generation phase, the prioritized demand time series generated in the demand prioritization phase are processed in light of the available supply and resources in the production network. The result of this phase is a new production schedule that incorporates the updated demand with minimized changes to the production schedule while adhering to the priority demands of the particular production plant where it is employed.

The process of this invention ensures generation of a feasible production schedule that respects previous commitments as far as required, while, at the same time, giving the fulfillment plant and its customers quantity flexibility and time flexibility to meet their own changing demands. This process maximizes production efficiency without relying on risky forecasts and adheres to necessary production plant goals to align supply chain planning with marketing and corporate strategy automatically and dynamically whenever customer demands are updated. The end results include a more efficient production planning process, greater flexibility for customers, a reduced "Frozen Zone" time period, decreased safety stocks, decreased reliance on risk, and easy implementation of marketing goals and corporate strategy.

It is readily apparent to one skilled in the art that the Dynamic Fulfillment Planning method may be used in any field where a changing demand load must be incorporated into a fulfillment plan with limited time or resources. While the examples in this description show the Dynamic Fulfillment Planning process's use in a production plant, the method may also be used in other fields.

Further areas of applicability will become apparent from the description provided herein. It should be understood that the description and specific examples are intended for purposes of illustration only and are not intended to limit the scope of the present disclosure.

DESCRIPTION OF THE DRAWINGS

The drawings described herein are for illustration purposes only and are not intended to limit the scope of the present disclosure in any way.

In the supplied figures, time series are generally shown as boxes containing 1×5 spreadsheets. Steps and values are generally shown as boxes containing only text. This diagrammatic convention is not intended to limit the disclosure in any way, but rather to clarify a description of a preferred embodiment.

DETAILED DESCRIPTION

The following description is merely exemplary in nature and is not intended to limit the present disclosure, application, or uses. It should be understood that throughout the drawings, corresponding reference numerals indicate like or corresponding parts and features.

The equations used in this description may contain traditional mathematical expressions or functions available in typical spreadsheet programs, such as certain versions of Microsoft Excel. It is understood by those skilled in the art that the equations disclosed may be easily modified or translated for implementation in other programs, apparatuses, or programming languages.

The following disclosure includes calculation steps separated into separate phases. It is understood by those skilled in the art that the calculation steps may be completed in any other order and with or without being separated into different phases, except where logic requires otherwise.

Figure 1:
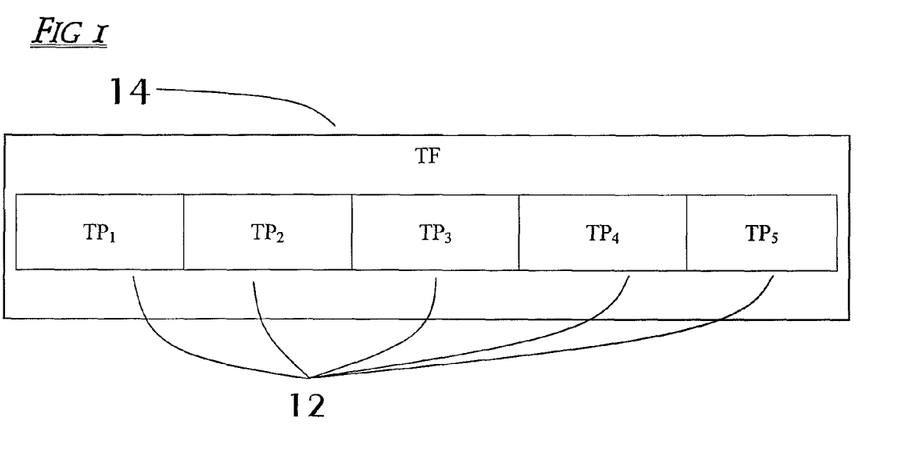
FIG. 1 is a flow chart showing a preferred embodiment of a timeframe containing five time periods.

Referring to FIG. 1, in a fulfillment process, demand signals comprise a time series of requested quantities per product, per customer, or per channel, for each time period (TP) 12 over a timeframe (TF) 14. The length of the timeframe (TF) 14 is the sum of the lengths of all time periods (TP) 12. Equation 1 shows an example of a generalized TF 14 calculation, where "n" is the number of time periods in the particular time frame and "$TP_x$" represents the current time period.

$$TF = \sum_{x=0}^{n} TP_{(x)} \qquad \text{Equation 1}$$

In some preferred embodiments, a typical time period (TP) 12 would encompass one day and a typical time frame (TF) 14 would encompass one work week, so the typical number of time periods in the particular time frame would equal five. It is readily apparent to one skilled in the art that other amounts of TP 12 and TF 14 are possible, depending on the specific production plant.

Figure 2:
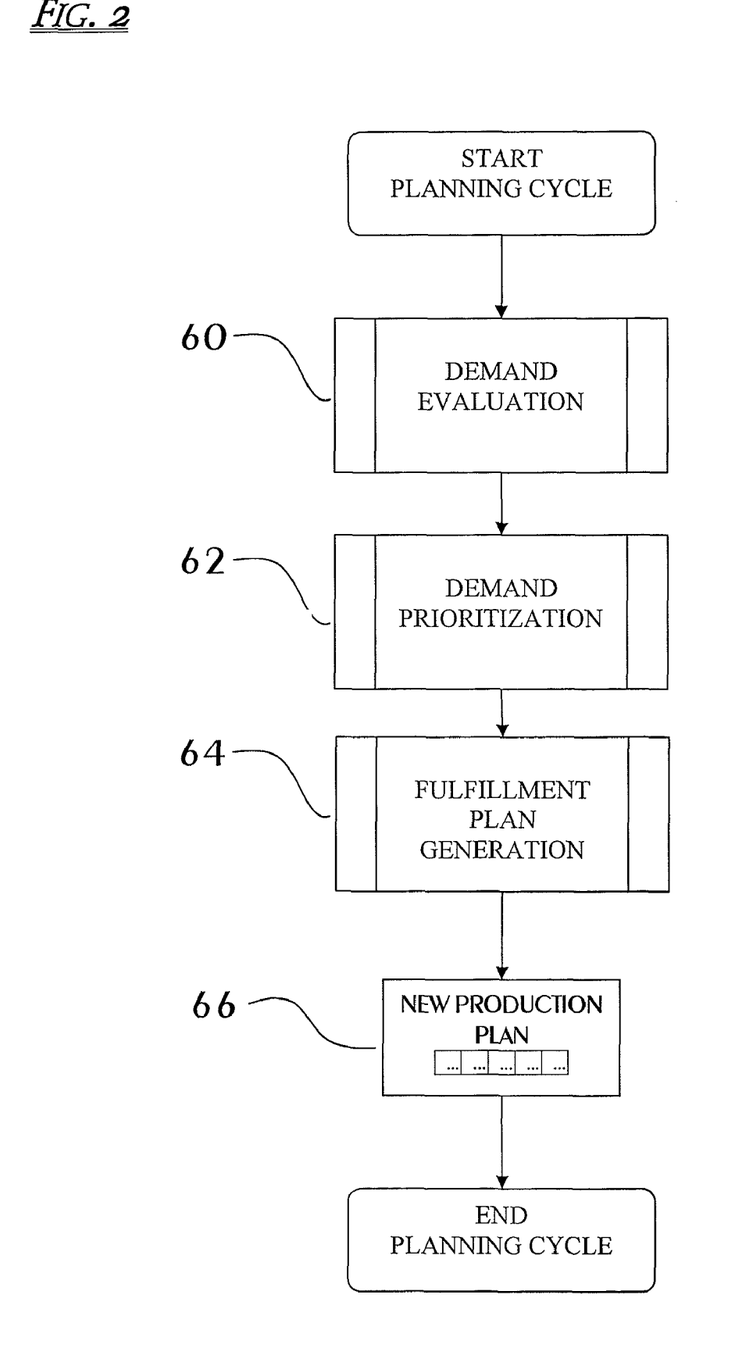
FIG. 2 is a high-level flow chart showing a preferred embodiment of the invention detailing the phases necessary for processing of the initial baseline demand and updated demand signals.

Referring to FIG. 2, for each planning cycle, the dynamic fulfillment planning process goes through three phases in order to generate a new production plan 66. The phases are demand evaluation 60, demand prioritization, 62, and fulfillment plan generation 64.

Figure 3:
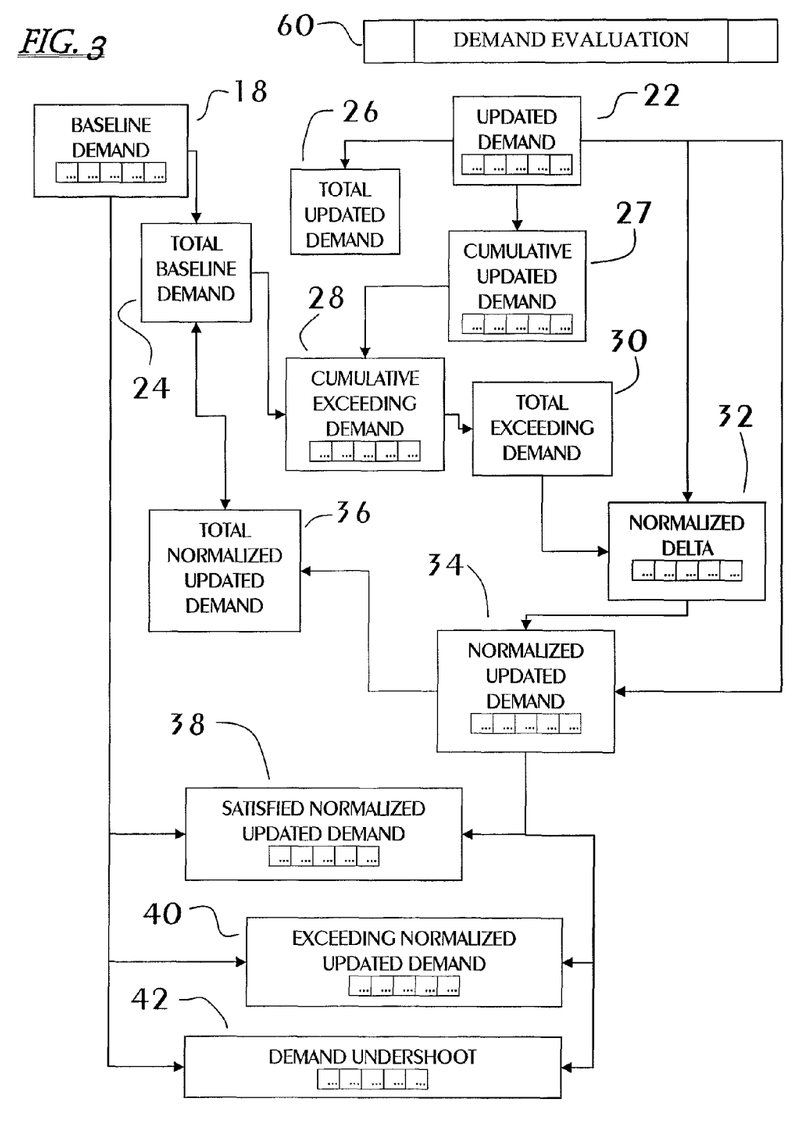
FIG. 3 is a flow chart showing a preferred embodiment of the invention detailing the steps of the demand evaluation process.

Referring to FIG. 3, in the demand evaluation 60 phase, updated demand signals (UD) 22 are received for a certain product, customer, or channel, as a quantity per time period (TP) 12. Baseline demand (BD) 18 signals normally already exist for a certain product, customer, or channel as a quantity per time period (TP) 12. During an initial planning cycle, where no existing orders are incorporated, the baseline demand (BD) 18 is the set of zeroes for all time periods (TP) 12. The sum of all baseline demand (BD) 18 signals over all time periods (TP) 12 is the total baseline demand (TBD) 24. Equation 2 shows an example of a generalized TBD 24 calculation.

$$TBD = \sum_{x=0}^{n} BD_{(x)} \qquad \text{Equation 2}$$

The sum of all updated demand signals starting from the first TP 12 to a specified $TP_m$ is the cumulative updated demand (CUD) 27 for that $TP_m$. Equation 3a shows an example of a generalized calculation for the CUD 27. The sum of all updated demand signals over all periods is the total updated demand (TUD) 26. Equation 3b shows an example of a generalized calculation for the TUD 26.

$$CUD_{(m)} = \sum_{x=0}^{m} UD_{(x)} \qquad \text{Equation 3a}$$

$$TUD = \sum_{x=0}^{n} UD_{(x)} \qquad \text{Equation 3b}$$

A cumulative exceeding demand (CED) 28 is calculated based on equation 4.

$$CED = MAX(0,(CUD-TBD)) \qquad \text{Equation 4}$$

The CED 28 calculated for each time period 12 will show in which time period 12 the cumulative updated demand (CUD) 27 will begin to exceed the total baseline demand (TBD) 24. As long as the CUD 27 can be met by the current plan, the CED 28 will be zero. When the CUD 27 begins to exceed the current plan's capacity, the CED 28 will no longer be zero. The CED 28 of the final time period 12 of the timeframe 14 will equal the total exceeding demand (TED) 30. Equation 5 shows how the calculation of the CED of the final time period 12 of the timeframe 14 will look as it calculates the TED 30.

$$CED_{(n)} = TED = MAX(0,(TUD-TBD)) \qquad \text{Equation 5}$$

The normalized delta NΔ 32 is then calculated for each time period from 0 to n according to the series of equations listed under equation 6. It is readily apparent to one skilled in the art that the number of periods may be less than four in order to achieve the intended results of this equation series.

$$N\Delta_{(0)} = MIN(UD_{(0)},(TED-N\Delta_{(1)} \ldots N\Delta_{(n-2)}-N\Delta_{(n-1)}-N\Delta_{(n)}))$$

$$N\Delta_{(n-2)} = MIN(UD_{(n-2)},(TED-N\Delta_{(n-1)}-N\Delta_{(n)}))$$

$$N\Delta_{(n-1)} = MIN(UD_{(n-1)},(TED-N\Delta_{(n)}))$$

$$N\Delta_{(n)} = MIN(UD_{(n)},TED) \qquad \text{Equation 6}$$

The resultant series of NΔ 32 values shows a redistribution of the total exceeding demand (TED) 30 backwards across the timeframe 14. This step minimizes changes in the production schedule.

The normalized updated demand (NUD) 34 is then calculated for each time period 12 according to equation 7 where the NUD 34 is the difference between the UD 22 and NΔ 32.

$$NUD = UD - N\Delta \qquad \text{Equation 7}$$

Through the use of NΔ 32 values and equations 6 and 7, the total exceeding demand (TED) 30 is subtracted from the total updated demand (TUD) 26 in incremental steps across the least number of time periods 12 starting with a given period and given skimming direction—either backwards or forwards in time. To accomplish different skimming methods, NΔ 32 values can be calculated with an offset "n" value. For example, the NΔ 32 demand signal can be shifted so that the first time period 12 of the NΔ 32 demand signal corresponds with any time period 12 of the current timeframe 14. Furthermore, the NΔ 32 demand signal can be adjusted so that increasing time periods 12 in the NΔ 32 demand signal correspond to decreasing time periods 12 in the current timeframe 14. The total normalized updated demand (TNUD) 36 now equals the total baseline demand (TBD) 24.

In some preferred embodiments, it is optimal to start skimming with the last time period 12 of the timeframe 14 and, moving backwards in time by increments of one time period 12, subtracting NΔ 32 from UD 22 until NΔ 32 is zero. Using this approach, short term demand requests are affected as little as possible, making requests for quantity adjustments available as late as possible.

A satisfied normalized updated demand (SNUD) 38 can be calculated for each time period 12 as the minimum of the baseline demand (BD) 18 and the normalized updated demand (NUD) 34 for that time period 12, as seen in equation 8.

$$SNUD = MIN(BD,NUD) \qquad \text{Equation 8}$$

The satisfied normalized updated demand 38 time series is less or equal to baseline demand 18 and normalized updated demand 34 in each time period, thus creating a time series representing satisfied demand in the new production plan.

The exceeding normalized updated demand (ENUD) 40 is the demand by which normalized updated demand 34 exceeds baseline demand 18 in any time period 12, but which can still be satisfied within the timeframe 14, since the total ENUD 40 plus SNUD 38 equals total baseline demand (TBD) 24. The ENUD 40 is calculated as the non-negative values of BD subtracted from NUD as shown in equation 9.

$$ENUD = MAX(0,(NUD-BD)) \qquad \text{Equation 9}$$

Demand undershoot (DU) 42 is the demand by which normalized updated demand (NUD) 34 undershoots baseline demand (BD) 18 in any time period, and thus shows new, free capacity as compared to BD 18. The DU 42 can be calculated as the non-negative values of NUD 34 subtracted from BD 18 as shown in equation 10.

$$DU = MAX(0, BD - NUD) \quad \text{Equation 10}$$

Therefore, through the previous calculations, the updated demand (UD) 22 can be separated into a total exceeding demand (TED) 30 as shown in equation 5, a satisfied normalized updated demand (SNUD) 38 as shown in equation 8, an exceeding normalized updated demand (ENUD) 40 as shown in equation 9, and a demand undershoot (DU) 42 as shown in equation 10.

Figure 4:
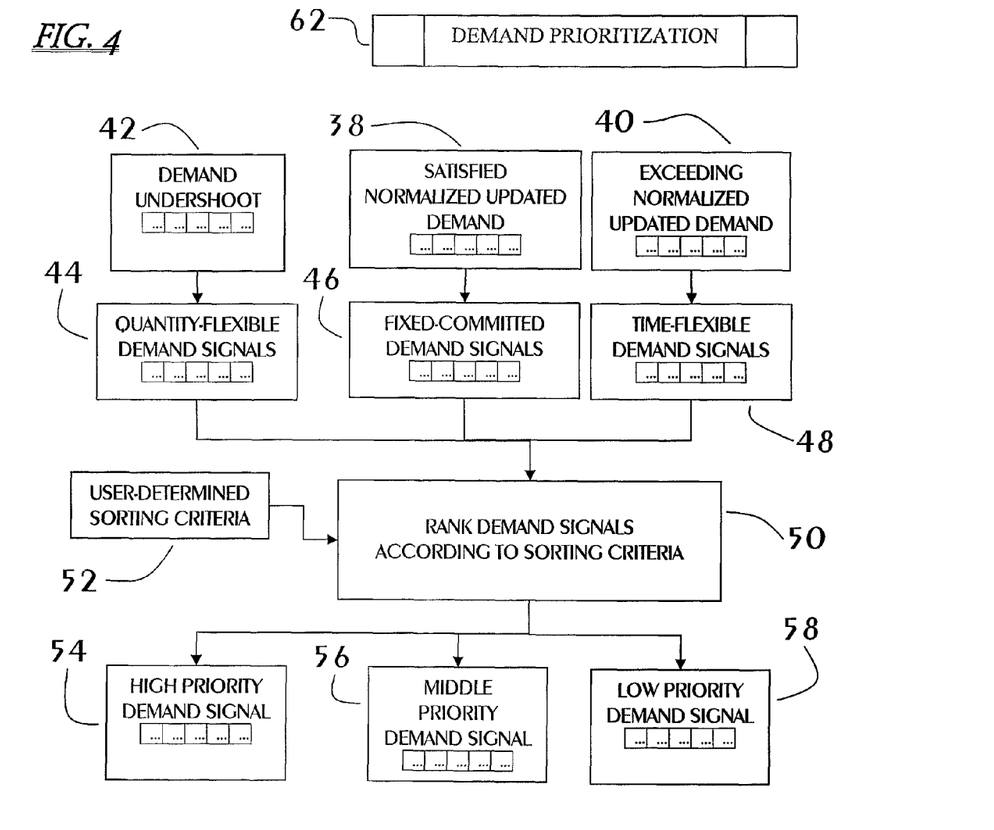
FIG. 4 is a flow chart showing a preferred embodiment of the invention detailing the steps of the demand prioritization process.

Referring to FIG. 4, during the demand prioritization 62 phase, each of the DU 42, SNUD 38, and ENUD 40 time series can be converted into updated demand signals based on type. DU 42 demand signals are quantity-flexible demand signals 44 because they show available room to change quantity within certain time periods 12 of the current timeframe 14. SNUD 38 demand signals are fixed-committed demand signals 46 because they represent the demand that is already committed and will be completed as scheduled. ENUD 40 demand signals are time-flexible demand signals 48 because they represent the demand that will not be completed as scheduled, but will nevertheless be completed within the current timeframe 14.

The demand signals can then be ranked based on a predetermined ranking process 50 using user-configurable sorting criteria 52. In a preferred embodiment, one of these criteria is the demand signal type. The demand signals are then prioritized into a high priority demand signal 54, a middle priority demand signal 56, and a low priority demand signal 58. It is readily apparent to one skilled in the art that more or less than three ranks of priority may be used to prioritize any number of demand signals. In a preferred embodiment, the fixed-committed demand signal 46 is the high priority demand signal 54 and its production and delivery date remains in the original time period 12. In this embodiment, the time-flexible demand signal 48 is a middle priority demand signal 56 and its production and delivery date may shift to a later time period 12, but will remain within the timeframe 14. In this embodiment, the quantity-flexible demand signal 44 is the low priority demand signal 58 and its production and delivery date may shift to a later time period 12 and possibly a later timeframe 14.

Figure 5:
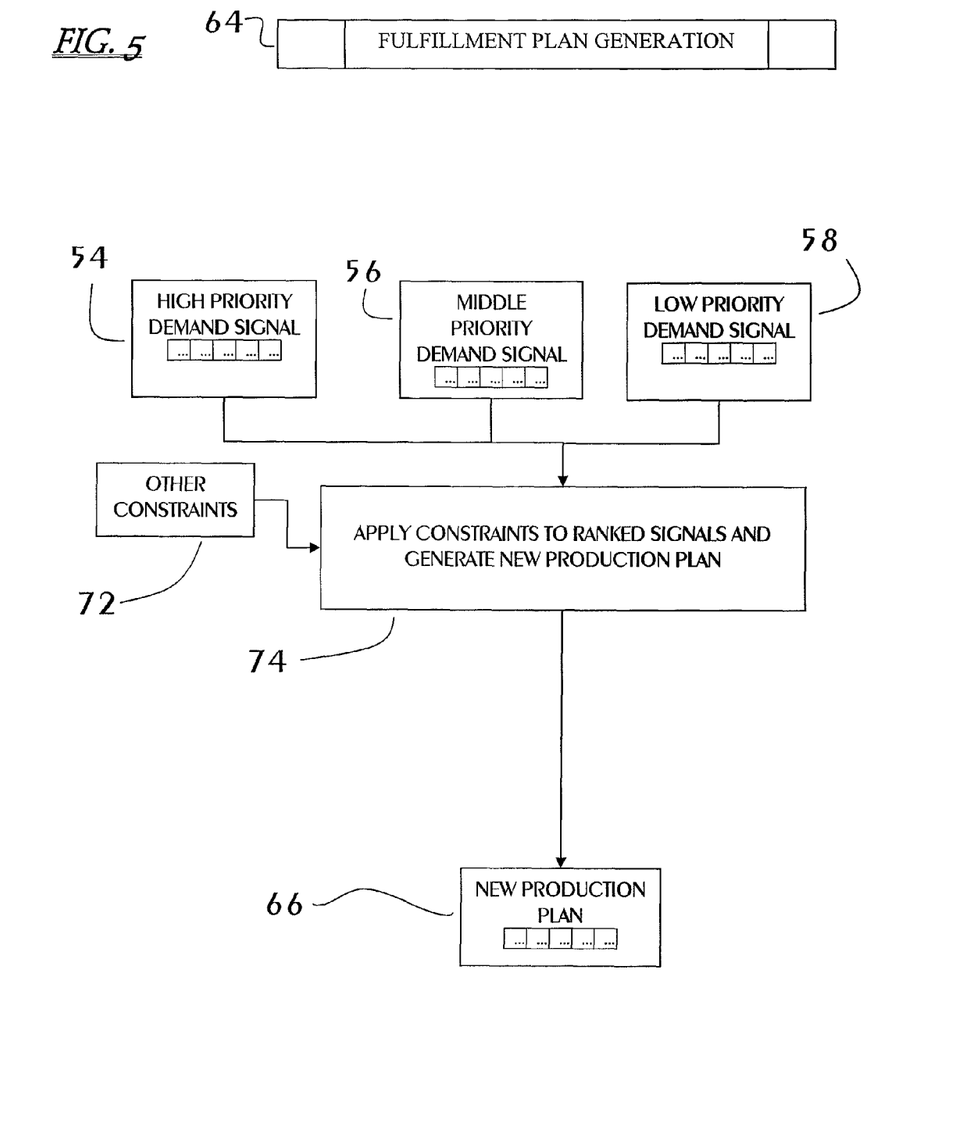
FIG. 5 is a flow chart showing a preferred embodiment of the invention detailing the steps of the fulfillment plan generation process.
Figure 6:
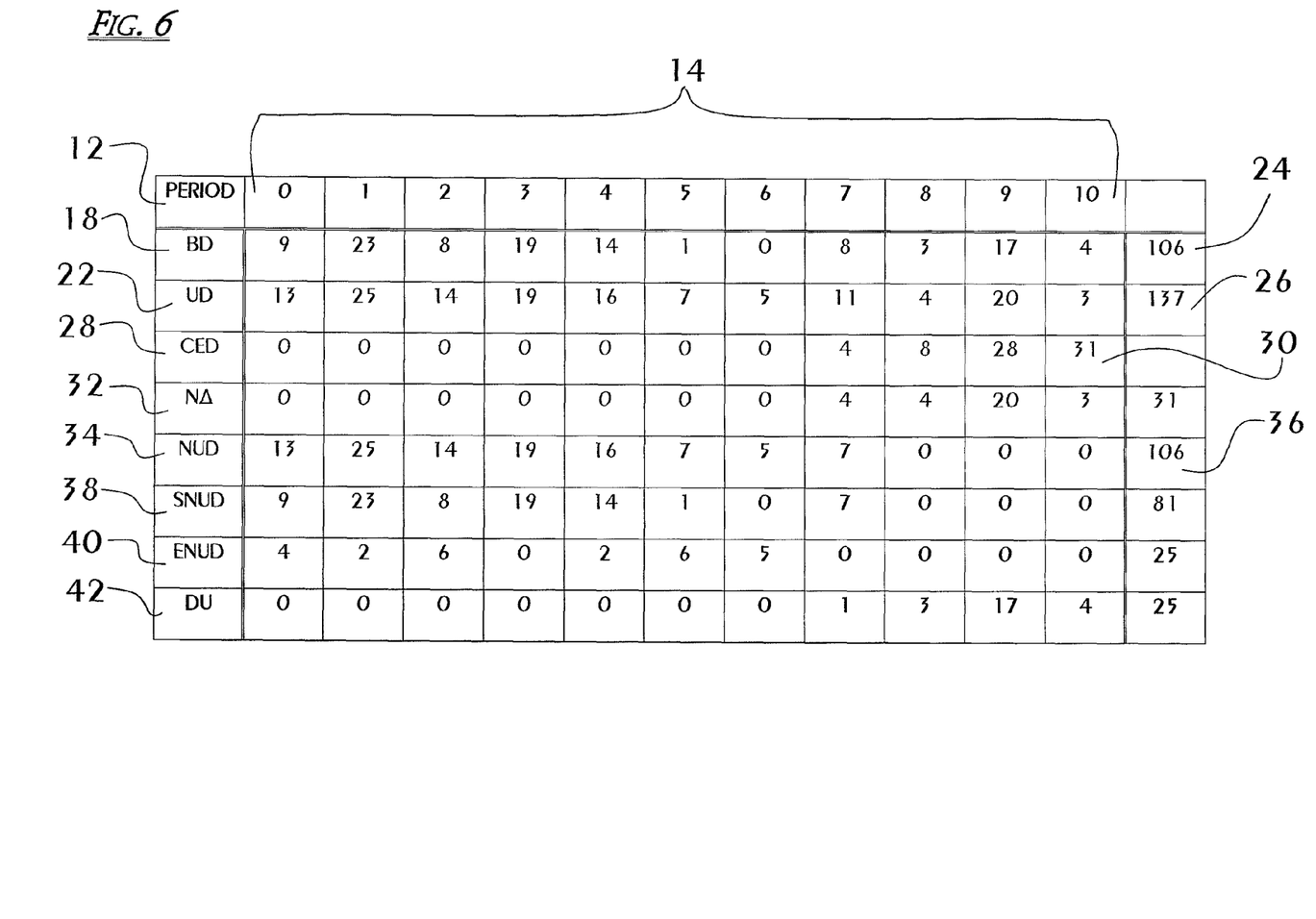
FIG. 6 is an example spreadsheet of a preferred embodiment of the invention showing example calculation results based on an example baseline demand and example updated demand.

During the fulfillment plan generation 64 phase, as shown in FIG. 5, the prioritized demand signals 54, 56, and 58 are matched to other constraints 56. These other constraints 72 include such constraints as resource capacities and plant capabilities. In a matching step 74, the constraints 72 are applied to the ranked signals and a new production plan 66 is issued with the updated demand 22 being covered as priorities and resources permit. Any demand which cannot be covered is clearly identified and can be incorporated into the next planning cycle or next timeframe.

The advantages of the above described embodiments and improvements are readily apparent to one skilled in the art as enabling the effective and efficient dynamic generation of a fulfillment plan. Additional design considerations may be incorporated without departing from the spirit and scope of the invention. Accordingly, it is not intended that the invention be limited by the particular embodiments or forms described above, but by the appended claims.

I claim:

1. In a timeframe comprised of a predetermined number of time periods, a dynamic fulfillment planning method, comprising the steps of:

providing a baseline demand signal signifying a current fulfillment plan;

providing an updated demand signal signifying desired changes to the current fulfillment plan;

calculating, using the baseline demand signal and the updated demand signal, a cumulative exceeding demand signal signifying an amount of updated demand which cannot be completed within the current fulfillment plan;

distributing the cumulative exceeding demand signal across the baseline demand signal according to a predetermined rule to create a normalized updated demand signal;

calculating a new fulfillment plan using the normalized updated demand signal.

2. The dynamic fulfillment planning method of claim 1, wherein the distributing step comprises the steps of:

calculating a normalized delta value for a specific time period in a specific timeframe based on a smaller value of either the updated demand signal at the specific time period or a total exceeded demand signal for the specific timeframe;

calculating the normalized updated demand signal by subtracting the normalized delta value for each of a plurality of time periods in the specific timeframe from the updated demand signal for the specific timeframe.

3. The dynamic fulfillment planning method of claim 1, additionally comprising the step of:

calculating, from the normalized updated demand signal, a series of individual normalized updated demand signals that signify different aspects of the normalized updated demand signal.

4. The dynamic fulfillment planning method of claim 3, wherein:

the series of individual normalized updated demand signals include at least one individual normalized updated demand signal selected from a list consisting of a satisfied normalized updated demand signal, an exceeding normalized updated demand signal, and a demand undershoot demand signal.

5. The dynamic fulfillment planning method of claim 3, wherein:

the calculating a new fulfillment plan step uses at least one of the normalized updated demand signals of the series of individual normalized updated demand signals.

6. The dynamic fulfillment planning method of claim 5, wherein:

the series of individual normalized updated demand signals contains at least two normalized updated demand signals; and at least one of the normalized updated demand signals of the series of individual normalized updated demand signals is given fulfillment preference over a remainder of normalized updated demand signals of the series of individual normalized updated demand signals during the calculating a new fulfillment plan step.

7. The dynamic fulfillment planning method of claim 6 wherein:

a satisfied normalized updated demand signal is given fulfillment preference over an exceeding normalized updated demand signal during the calculating a new fulfillment plan step.

8. A computer readable medium that stores instructions executable by one or more processors to perform a method of dynamically preparing a new fulfillment plan based on a current fulfillment plan and a set of desired changes to the current fulfillment plan, comprising:

providing, a baseline demand signal signifying the current fulfillment plan;

providing, an updated demand signal signifying the desired changes to the current fulfillment plan;

calculating, using the baseline demand signal and the updated demand signal, a cumulative exceeding demand signal signifying an amount of updated demand which cannot be completed within the current fulfillment plan;

distributing the cumulative exceeding demand signal across the baseline demand signal according to a predetermined rule to create a normalized updated demand signal;

calculating a new fulfillment plan using the normalized updated demand signal.

9. The computer readable medium for performing the method of dynamically preparing a new fulfillment plan of claim 8, wherein the distributing step comprises the steps of:

calculating a normalized delta value for a specific time period in a specific timeframe based on a smaller value of either the updated demand signal at the specific time period or a total exceeded demand signal for the specific timeframe;

calculating the normalized updated demand signal by subtracting the normalized delta value for each of a plurality of time periods in the specific timeframe from the updated demand signal for the specific timeframe.

10. The computer readable medium for performing the method of dynamically preparing a new fulfillment plan of claim 8, additionally comprising the step of:

calculating, from the normalized updated demand signal, a series of individual normalized updated demand signals that signify different aspects of the normalized updated demand signal.

11. The computer readable medium for performing the method of dynamically preparing a new fulfillment plan of claim 10, wherein:

the series of individual normalized updated demand signals include at least one individual normalized updated demand signal selected from a list consisting of a satisfied normalized updated demand signal, an exceeding normalized updated demand signal, and a demand undershoot demand signal.

12. The computer readable medium for performing the method of dynamically preparing a new fulfillment plan of claim 10, wherein:

the calculating a new fulfillment plan step uses at least one of the normalized updated demand signals of the series of individual normalized updated demand signals.

13. The computer readable medium for performing the method of dynamically preparing a new fulfillment plan of claim 12, wherein:

the series of individual normalized updated demand signals contains at least two normalized updated demand signals; and at least one of the normalized updated demand signals of the series of individual normalized updated demand signals is given fulfillment preference over a remainder of normalized updated demand signals of the series of individual normalized updated demand signals during the calculating a new fulfillment plan step.

14. The computer readable medium for performing the method of dynamically preparing a new fulfillment plan of claim 13 wherein:

a satisfied normalized updated demand signal is given fulfillment preference over an exceeding normalized updated demand signal during the calculating a new fulfillment plan step.

* * * * *